US006739558B2

(12) United States Patent  
Stephen et al.

(10) Patent No.: US 6,739,558 B2
(45) Date of Patent: May 25, 2004

(54) BARBECUE GRILL ASSEMBLY WITH A SHELF COMPONENT

(75) Inventors: Robert T. Stephen, Barrington, IL (US); Adrian A. Bruno, Rolling Meadows, IL (US); Ewald Sieg, Palatine, IL (US); Daniel S. Choi, Mundelein, IL (US)

(73) Assignee: Weber-Stephen Products Co., Palatine, IL (US)

( * ) Notice: Subject to any disclaimer, the term of this patent is extended or adjusted under 35 U.S.C. 154(b) by 0 days.

(21) Appl. No.: 09/927,897

(22) Filed: Aug. 10, 2001

(65) Prior Publication Data

US 2003/0029973 A1 Feb. 13, 2003

(51) Int. Cl.⁷ ................................. A47K 1/04
(52) U.S. Cl. ..................................... 248/129
(58) Field of Search ............................ 248/129, 240.1, 248/244, 249, 250, 175; 126/41 R, 9 R, 25 R, 154

(56) References Cited

U.S. PATENT DOCUMENTS

| | | | |
|---|---|---|---|
| 4,627,410 A | 12/1986 | Jung | 126/25 A |
| 4,723,814 A * | 2/1988 | Hunt | 297/219.1 |
| 4,741,322 A | 5/1988 | Lin | 126/25 R |
| 4,809,671 A | 3/1989 | Vallejo, Jr. | 126/39 R |
| 4,896,652 A | 1/1990 | Geiter | 126/41 R |
| 4,949,701 A | 8/1990 | Krosp et al. | 126/41 R |
| 4,955,358 A | 9/1990 | Harris et al. | 126/25 R |
| 4,966,125 A | 10/1990 | Stephen et al. | 126/25 R |
| 4,984,515 A | 1/1991 | Pivonka | 99/449 |
| 5,027,788 A | 7/1991 | Schlosser et al. | 126/25 R |
| 5,050,577 A | 9/1991 | Baynes et al. | 126/9 R |
| 5,056,364 A | 10/1991 | Kahler et al. | 73/296 |
| 5,072,718 A | 12/1991 | Seal | 126/41 R |
| 5,076,252 A | 12/1991 | Schlosser et al. | 126/25 R |
| 5,109,834 A | 5/1992 | Collins et al. | 126/41 R |
| 5,111,802 A | 5/1992 | Lin | 126/25 R |
| 5,140,973 A | 8/1992 | Home | 126/41 R |
| 5,165,385 A | 11/1992 | Doolittle et al. | 126/25 R |
| 5,203,317 A | 4/1993 | James | 126/41 R |
| 5,220,764 A | 6/1993 | James | 52/473 |
| 5,408,985 A | 4/1995 | Giebel et al. | 126/41 R |
| 5,452,707 A | 9/1995 | Harris et al. | 126/41 R |
| 5,531,464 A | 7/1996 | Maurer et al. | 280/47.35 |
| 5,573,220 A * | 11/1996 | Whittaker et al. | 248/638 |
| 5,579,755 A | 12/1996 | Johnston | 126/41 R |
| 5,598,834 A | 2/1997 | Grady | 126/506 |
| 5,623,866 A | 4/1997 | Home | 99/444 |
| 5,762,560 A * | 6/1998 | Emmett et al. | 470/20 |
| 5,765,469 A | 6/1998 | Schlosser et al. | 99/337 |
| 5,836,298 A | 11/1998 | Grady | 126/506 |
| 5,934,183 A | 8/1999 | Schlosser et al. | 99/385 |
| 6,205,912 B1 * | 3/2001 | Chiu | 99/339 |
| 6,257,229 B1 | 7/2001 | Stewart et al. | 126/276 |
| 6,321,921 B1 * | 11/2001 | Massoudnia | 211/188 |
| 6,357,434 B1 * | 3/2002 | Bossler | 126/25 A |
| 6,439,220 B1 * | 8/2002 | Johnson | 126/25 R |
| 2002/0148459 A1 * | 10/2002 | McCarty et al. | 126/25 R |

* cited by examiner

Primary Examiner—Leslie A. Braun
Assistant Examiner—A. Joseph Wujciak, III
(74) Attorney, Agent, or Firm—Wallenstein Wagner & Rockey, Ltd.

(57) ABSTRACT

The present invention provides a barbecue grill assembly 10 comprising an upper frame assembly 12 and a lower frame assembly 14. The lower frame assembly 14 comprises a shelf 50 and a plurality of lower frame members 26, 28 which define an interior space 40. At least one frame member 28 has an aperture 80. The shelf 50 has at least one pin 70 cooperatively dimensioned with the aperture 80. The pin 70 is received by the aperture 80 to connect the shelf 50 to the lower frame members 26, 28 and form the lower frame assembly 14. The shelf 50 has a perimeter that is cooperatively dimensioned with the interior space 40 such that the shelf 50 is positioned within the interior space 40. The shelf 50 provides structural integrity to the lower assembly 14 such that the lower assembly 14 can support the upper assembly 12 and the cooking chamber 16.

16 Claims, 7 Drawing Sheets

BARBECUE GRILL ASSEMBLY WITH A SHELF COMPONENT

FEDERALLY SPONSORED RESEARCH OR DEVELOPMENT

Not Applicable.

CROSS-REFERENCE TO RELATED APPLICATIONS

Not Applicable.

TECHNICAL FIELD

The present invention relates to a barbecue grill assembly with a shelf component. More specifically, the present invention relates to a shelf for a barbecue grill assembly that provides support to a portion of the assembly.

BACKGROUND OF THE INVENTION

As the popularity of gas barbecue grills has increased, manufacturers have employed many types of shelves or trays for use in the frame supporting the barbecue grill. Generally, the tray is connected to a lower portion of the frame. The vast majority of existing trays are sheet metal or plastic, and have a thin-wall construction. Typically, the trays are connected to the extremities of the lower portion with fasteners such as nuts and bolts. The tray can be configured to provide support for other elements, including a fuel tank.

A concern with trays of this type is the difficulty in properly connecting the tray to the lower portion of the frame. A second concern is providing sufficient structural integrity of the tray and frame. A related concern is a possible loss of structural integrity due to the multiplicity of fasteners used to connect the tray to the lower portion of the frame.

An example of a gas barbecue grill having a tray design susceptible of such concerns identified above is U.S. Pat. No. 5,579,755 to Johnston. As shown in FIGS. 1 and 2 therein, the barbecue grill is supported by a complex frame with a lower portion. The tray is connected to vertical supports positioned at the extremities of the lower portion of the frame. A combination of threaded fasteners and nuts are used to connect the tray to the vertical supports. Prior to connecting the tray to the vertical supports, the lower portion of the frame lacks any cross-member support.

Due to the thin-wall construction of the tray and the use of threaded fasteners that are susceptible to loosen over time, the frame may naturally experience a reduction in structural integrity.

Another example of a barbecue grill design with the concerns identified above is U.S. Pat. No. 5,072,718 to Seal. Referring to FIG. 2 therein, the barbecue grill is supported by a frame comprising a plurality of bent tubular members and a tray. The tray is connected to vertical supports positioned at the extremities of the frame. A combination of threaded fasteners and nuts are used to connect the tray to the vertical supports. Like the '755 Patent to Johnston, prior to connecting the tray to the vertical supports, the lower portion of the frame lacks any cross-member support.

Therefore, there is a definite need for a shelf for use in a barbecue grill assembly that is durable and provides an enhanced degree of structural integrity to the frame supporting the barbecue grill. In addition, there is a need for a shelf that can be simply and reliably connected to the frame without the use of fasteners.

The present invention is provided to solve these and other problems.

SUMMARY OF THE INVENTION

The present invention relates to a barbecue grill assembly comprising an upper frame assembly and a lower frame assembly, the upper assembly adapted to receive a cooking chamber. The lower assembly having a shelf and a plurality of lower frame members. The lower frame members define an interior space. The shelf is a rigid structure with a perimeter cooperatively dimensioned with the interior space such that the shelf can be positioned within the interior space. Alternatively, the barbecue grill assembly has a single frame assembly with a plurality of frame members defining an interior space.

At least one of the lower frame members has an aperture. The shelf has at least one pin positioned on an edge of the shelf. The pin is cooperatively dimensioned with the aperture such that the pin is removably received by the aperture. When the shelf and the frame member are connected in this manner, the lower assembly has a rigid and stable construction thereby increasing the structural rigidity of the barbecue grill assembly.

Because the pin is adapted to be removably received by the aperture, the shelf can be quickly and easily disengaged from the lower frame member. As a result, the packaging and storage options for the grill assembly are increased.

In another preferred embodiment of the invention, the shelf has at least one securing member and at least one supporting member. The securing member is adapted to move between a first position, wherein the securing member engages an inner portion of the lower frame member, and a second position, wherein the securing member engages a bottom portion of the lower frame member. In the second position, the supporting member engages at least an upper portion of the lower frame member.

The first position is a transitory position, whereas the second position is a stable position. In the second position, the shelf is connected to the lower frame member thereby securing the lower assembly. As a result, the structural rigidity of both the lower assembly and the barbecue grill assembly is increased.

In another preferred embodiment, the shelf has at least one securing member, one supporting member, and one finger. In the first position, the finger slidingly engages an inner portion of the lower frame member. In the second portion, the finger engages the inner portion to prevent movement of the shelf with respect to the lower frame member.

Other features and advantages of the invention will be apparent from the following specification taken in conjunction with the following drawings.

DETAILED DESCRIPTION OF THE INVENTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
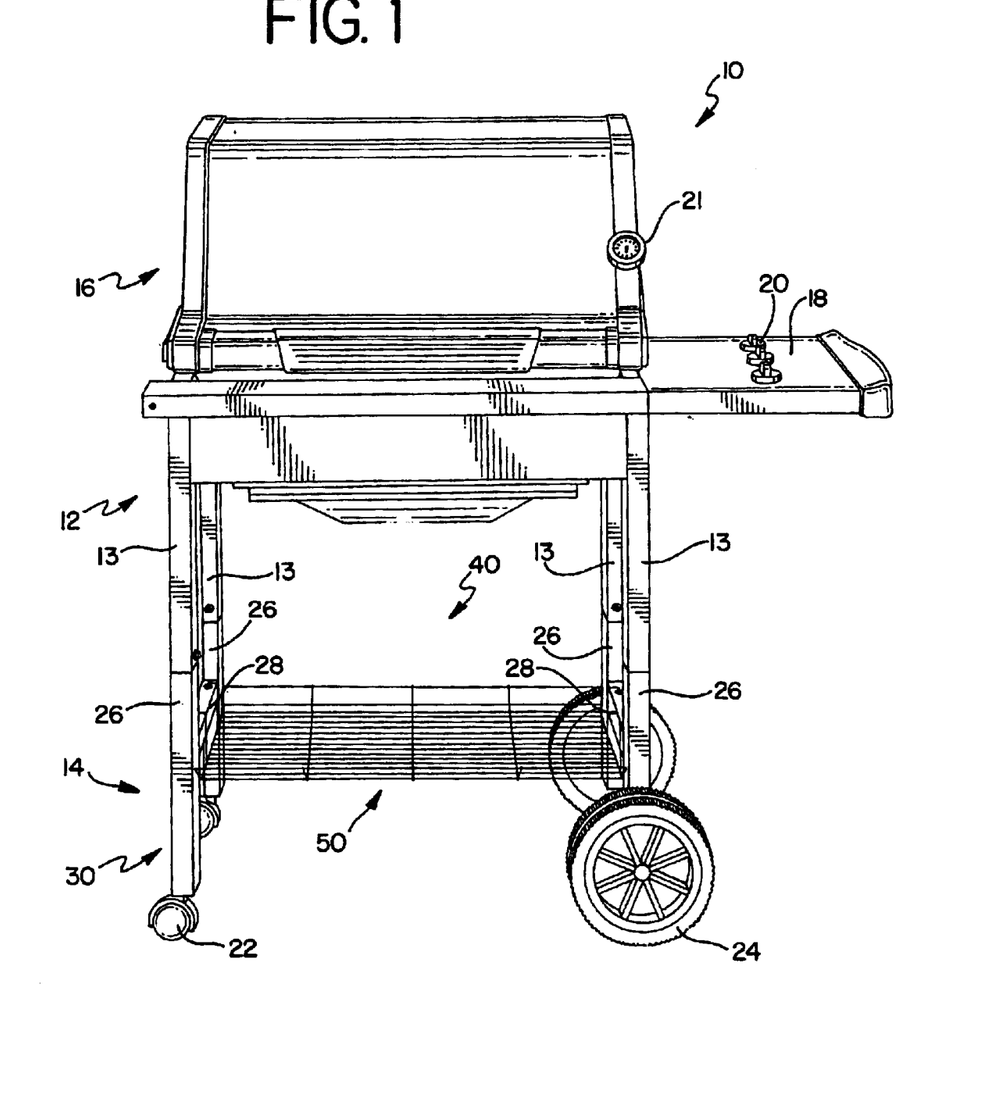
FIG. 1 is a front elevation view of a barbecue grill assembly including a shelf of the present invention.

A barbecue grill assembly 10 is shown in FIG. 1. The barbecue grill assembly 10 comprises an upper frame assembly 12 and a lower frame assembly 14. The upper frame assembly 12 has a configuration sufficient to receive and/or support a cooking chamber or firebox 16. The upper frame assembly 12 is formed from a plurality of upper frame members 13. In addition, the barbecue grill assembly 10 can include a control panel 18, controls 20, temperature gauge 21, wheels 22, and casters 24.

Alternatively, the grill assembly 10 has a single frame assembly. This means that the grill assembly 10 does not have distinct upper and lower assemblies 12, 14. In this configuration, the single frame assembly is adapted to receive and/or support the cooking chamber 16. The single frame assembly is formed from a combination of frame members, including vertical, horizontal, and/or cross-members.

The barbecue grill assembly 10 made according to this invention includes a shelf 50 that is positioned within an interior space 40 of the frame or support structure. In the preferred embodiments shown in the figures, and used in the description herein, the support structure is made up of a number of frame members, including vertical members 26 and a form of cross-members 28, such as horizontal struts. The frame members may form a part of the upper assembly 12 and a part of the lower assembly 14. Alternatively, multiple frame members may by joined to form sub-assemblies that are joined together into the frame assembly. In an alternative embodiment, the interior space 40 may be defined by a plurality of spaced walls of a barbecue grill support cabinet.

The primary function of the shelf 50 is to substantially secure the lower frame assembly 14 in a grill assembly 10 having distinct upper and lower assemblies, and to substantially secure the frame assembly in a grill assembly 10 having a single assembly. In general terms, the shelf 50 secures members in a frame assembly in a generally rectangular configuration. With a grill assembly 10 that has distinct upper and lower assemblies 12, 14 that are spaced a distance apart, the cooking chamber 16 connects and secures the upper assembly 12 and the shelf 50 connects and secures the lower assembly 14. With a grill assembly 10 that has distinct left and right assemblies that are spaced a distance apart, the cooking chamber 16 connects and secures a portion of the right and left assemblies and the shelf 50 connects and secures the remaining portion of the right and left assemblies.

The lower frame assembly 14 is partially formed from at least one frame member, including lower vertical members 26 and lower cross-members 28. The lower assembly 14 includes a shelf 50 positioned within the interior space 40 of the frame structure formed by the assemblies 12, 14. Preferably, the members 26, 28 form two H-shaped sub-assemblies 30 spaced a distance apart to define an interior space 40 adapted to receive the shelf 50. The shelf 50 is cooperatively dimensioned with the interior space 40 and is adapted to be generally positioned within the interior space 40 to connect the members 26, 28 and secure the lower frame assembly 14.

Alternatively, the lower cross-members 28 are omitted and lower horizontal members (not shown) are included in the lower frame assembly 14. In this configuration, the members 28 and the horizontal members define the interior space 40 and the shelf 50 connects the vertical members 26 and the horizontal members.

Preferably, the members 13, 26, 28 have a tubular configuration. However, single-sided and two-or three-sided members are within the scope of the invention. Multi-sided members can have a variety of cross-sectional shapes, including but not limited to square, rectangular, L-shaped, U-shaped, or circular.

Figure 2:
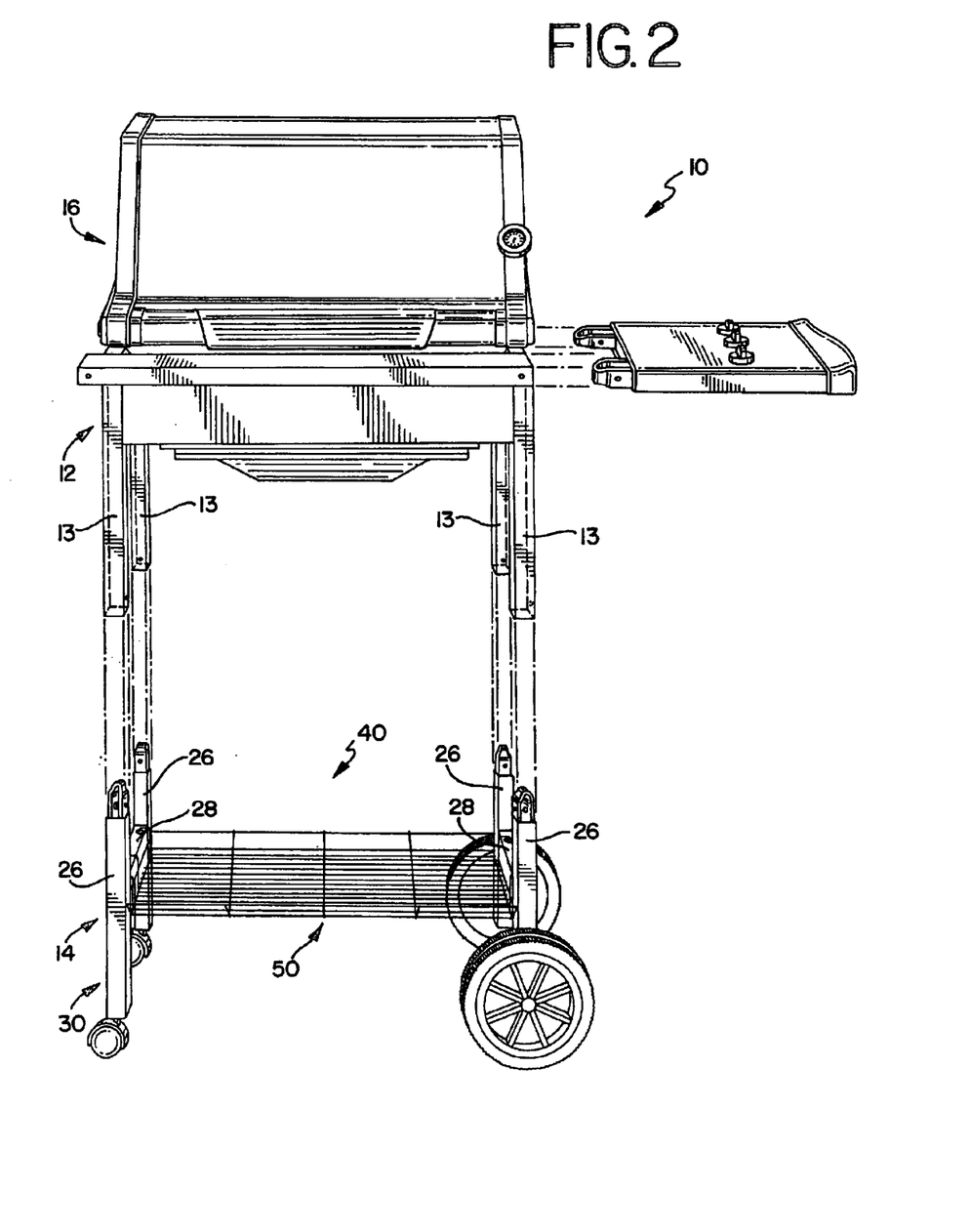
FIG. 2 is an exploded elevation view of the barbecue grill assembly of FIG. 1, showing the shelf connected to a lower frame assembly.

In general terms, the shelf 50 is a rigid structure that is positioned within the interior space 40 to join the members 26, 28 and form the lower assembly 14. Referring to FIG. 2, the shelf 50 provides structural integrity to the lower assembly 14 such that the lower assembly 14 can support the upper assembly 12 and the cooking chamber 16. In addition to providing structural support to the lower assembly 14, the shelf 50 is adapted to provide storage for the accessories used in connection with the grill assembly 10.

Figure 3:
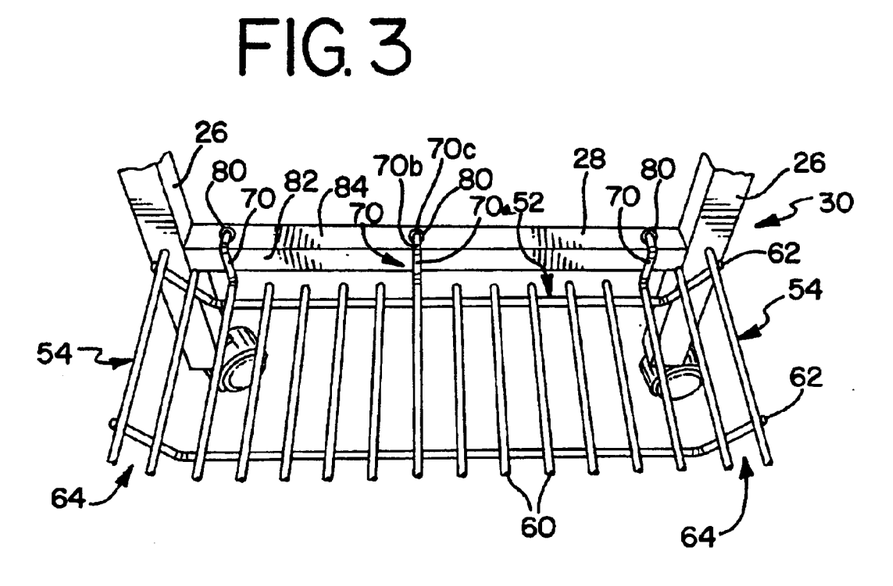
FIG. 3 is a partial elevation view of a first end of the shelf of FIG. 1.
Figure 4:
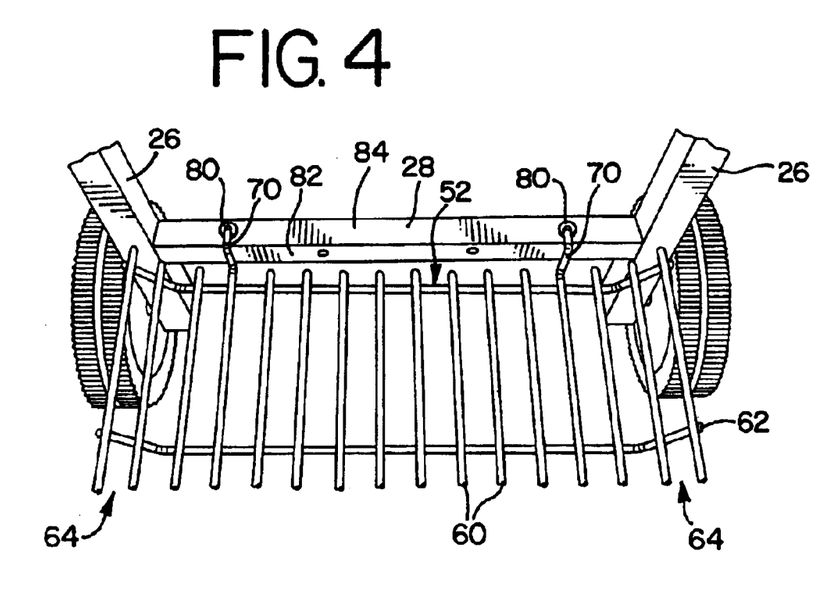
FIG. 4 is a partial elevation view of a second end of the shelf of FIG. 1.

As shown in FIGS. 3 and 4, the shelf 50 has a pair of opposed first edges 52 and a pair of opposed second edges 54. The edges 52, 54 form a perimeter P of the shelf 50. Although shown as having a generally rectangular configuration, the shelf 50 can have a variety of configurations, including square, elliptical or other curvilinear shapes.

Preferably, the shelf 50 is a wire rack formed from a plurality of welded rods. The shelf 50 comprises a plurality of longitudinal rods 60 and a plurality of transverse rods 62. Although the transverse rods 62 are shown positioned below the longitudinal rods 60, the orientation of the rods 60, 62 can be varied according to the design parameters of the shelf 50. A raised or angled portion 64 is positioned proximate the second edge 54. Alternatively, the raised portion 64 is positioned proximate the first edge 52. Because the shelf 50 is formed from a plurality of welded rods, the shelf 50 is stronger and more rigid than existing shelves having a thin-wall construction. Although shown as having a plurality of apertures or openings resulting from the intersection of the rods 62, 64, the shelf 50 can have a solid construction without apertures or openings.

The shelf 50 has at least one pin 70 on each of the first ends 52. Referring to FIGS. 3 and 4, the pin 70 extends from one of the longitudinal rods 60. Alternatively, the pin 70 extends from one of the transverse rods 62. Although five separate pins 70 are shown, the precise number of pins 70 varies with the design parameters of the shelf 50.

As shown in FIG. 3, the pin 70 has a first portion 70a, a second portion 70b, and a third portion 70c. The first portion 70a is generally a vertical segment of the pin 70. The second portion 70b is generally a horizontal segment of the pin 70. The third portion 70c is generally a vertical segment of the pin 70. The pin 70 is adapted to be removably received by an aperture 80 positioned in the cross-member 28. The pin 70 and the aperture 80 are in a mating relationship. Accordingly, the pin 70 and the aperture 80 are cooperatively dimensioned such that a portion of the pin 70 is received by the aperture 80. Also, the pin 70 and the aperture 80 are cooperatively positioned to facilitate the reception of the pin 70 by the aperture 80. The aperture 80 has an inner diameter that is adapted for frictional engagement with the pin 70. Alternatively, the aperture 80 is deformable for frictional engagement with the pin 70. In a preferred embodiment, the third portion 70c is removably received by the aperture 80. When the third portion 70c is received by the aperture 80, the second portion 70b engages a top wall 84 of the cross-member 28 and the first portion 70a engages an inner wall 82 of the cross-member 28. Alternatively, a bushing (not shown) is positioned within the aperture 80 wherein the bushing is adapted to receive a portion of the pin 70. The bushing can be formed from metal or plastic.

As shown in FIGS. 3 and 4, the number of pins 70 can vary between the pair of opposed first edges 52 of the shelf 50. Similarly, the number of apertures 80 can vary between the opposed sides of the lower assembly 14. Varying the number of pins 70 and corresponding apertures 80 between the first sides 52 ensures the proper assembly of the lower assembly 14 because the shelf 50 can be connected to the lower frame member 32 in only one manner.

When the shelf 50 is placed within the interior space 40 such that the pin 70 is received by the aperture 80, the shelf 50 is connected to the lower frame member 28. As a result, the structural integrity of both the lower assembly 14 and the grill assembly 10 is increased. Described in another manner, the shelf 50 provides structural integrity to the lower assembly 14 and the grill assembly 10 when the pin 70 is received by the aperture 80.

Depending upon the configuration of the upper assembly 12, the shelf 50 can be employed to connect to the upper frame members 13 of the upper assembly 12. In this manner, the shelf 50 provides structural integrity to the upper assembly 12 and the grill assembly 10 when the pin 70 is received by an aperture positioned in the upper frame member 13.

Because the pin 70 is removably received by the aperture 80, the shelf 50 can be quickly and easily disengaged from the cross-member 28. This is an important aspect for packaging and storage of the grill assembly 10 because the dimensions and configuration of the lower assembly 14 can be significantly reduced. In contrast to existing designs, no tools are required to disengage the shelf 50 from the cross-member 28 and disassemble the lower assembly 14. When the pin 70 is disengaged from the cross-member 28, the configuration and dimensions of the aperture 80 remain unchanged.

The shelf 50 can include means for locking (not shown) the pin 70 in the aperture 80. By locking the pin 70 within the aperture 80, the locking means further increases the structural integrity of the lower assembly 14. The locking means can include a detent and a cooperating groove, a flange on the pin 70, or a latch.

The shelf 50 and its related components, including the pin 52, can be formed from plastic, steel, aluminum, or other metals, including metal alloys. FIGS. 1–4 show an open grill assembly 10, meaning that the upper and lower assemblies 12, 14 are not enclosed. Panels and doors can be added to the grill assembly 10 to form an enclosed cabinet (not shown) positioned beneath the cooking chamber 16. Consistent with the above disclosure, the shelf 50 can be employed within the cabinet to form either a bottom wall or a top wall of the cabinet. In this configuration, the shelf 50 connects the panels and doors and provides structural integrity to the cabinet.

In another preferred embodiment, the grill assembly 10 has a single frame assembly, meaning that the grill assembly 10 does not have distinct upper and lower assemblies 12, 14. As a result, there is no junction between the upper and lower assemblies 12, 14 and the grill assembly 10 has a continuous appearance. In this configuration, the single frame assembly is adapted to receive and/or support the cooking chamber 16. The single frame assembly is formed from a combination of frame members, including vertical, horizontal, and/or cross-members. The frame members define an interior space 40 and the shelf 50 is cooperatively dimensioned with the interior space 40 such that the shelf 50 is positioned within the interior space 40.

At least one frame member has an aperture cooperatively dimensioned with the pin 70. Preferably, the frame member is located in a lower portion of the single frame assembly. However, the frame member can be located in an upper or intermediate portion of the single frame assembly. The aperture is adapted to removably receive the pin 70. In a manner consistent with the above disclosure, the shelf 50 is connected to the frame member. Consequently, the shelf 50 provides structural integrity to the single frame assembly and the single frame assembly is secured by the connection of the shelf 50 and the frame member.

Another preferred embodiment includes a frame for an outdoor cooking device (not shown) generally comprising an upper frame assembly and a lower frame assembly. The shelf 50 is employed within the lower frame assembly in a manner consistent with the above disclosure. Accordingly, the shelf 50 connects the lower assembly and provides structural integrity to the lower assembly.

Instead of receiving a cooking chamber, the frame is adapted to receive a cooking device, for example an auxiliary burner such as an outdoor stove-top burner, or a deep fryer. The frame is adapted to be mobile such that the frame and the cooking device can be moved between various locations, thereby increasing the versatility of the frame.

Figure 5:
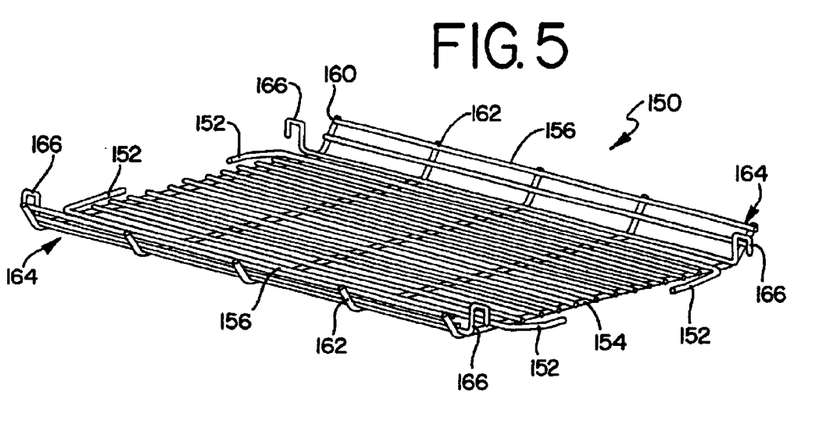
FIG. 5 is a perspective view of a second shelf embodiment.

In another preferred embodiment shown in FIG. 5, the grill assembly 10 includes a shelf 150. The shelf 150 has a pair of opposed first edges 154 and a pair of opposed second edges 156. The edges 154, 156 form a perimeter P of the shelf 150. Although shown as having a generally rectangular configuration, the shelf 150 can have a variety of configurations, including square, elliptical or other curvilinear shapes.

The shelf 150 has at least one securing member 152. The securing member 152 is a flexible structure adapted to be deformed or displaced a distance. Preferably, the securing member 152 extends from the shelf 150 such that a clearance exists between the securing member 152 and the second edge 156. The dimensions of the clearance varies with the configuration of the securing member 152. Although shown as having an angular configuration, the securing member 152 can have a curvilinear configuration. Described in a different manner, the securing member 152 is an elongated tab that extends from the shelf 150.

Preferably, the shelf 150 is a wire rack formed from a plurality of welded rods. The shelf 150 comprises a plurality of longitudinal rods 160 and a plurality of transverse rods 162. Although the transverse rods 162 are shown in FIG. 5 as being positioned below the longitudinal rods 160, the orientation of the rods 160, 162 can be varied according to the design parameters of the shelf 150. A raised or angled portion 164 is positioned proximate the second edge 156. Alternatively, the raised portion 164 is positioned proximate the first edge 154. Because the shelf 150 is formed from a plurality of welded rods, the shelf 150 is stronger and more rigid than existing shelves having a thin-wall construction. Although shown as having a plurality of apertures or openings resulting from the intersection of the rods 162, 164, the shelf 150 can have a solid construction without apertures or openings.

Figure 7:
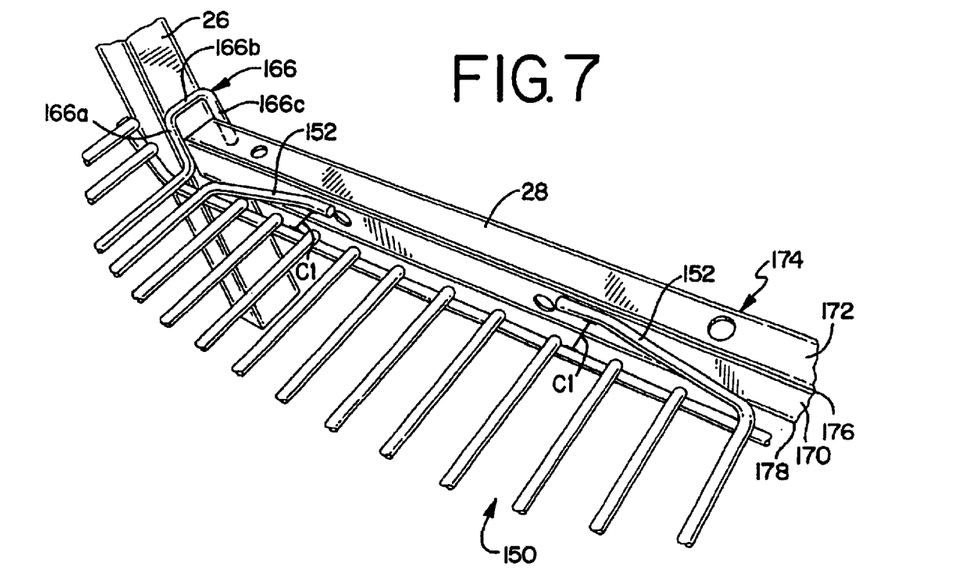
FIG. 7 is a partial perspective view of the shelf of FIG. 5, showing the shelf in a first position.

The shelf 150 has at least one support member 166. The support member 166 is adapted to engage a portion of the cross-member 28 when the shelf 150 is connected to the cross-member 28. Preferably, the support member 166 is positioned near the junction of the first and second edges 154, 156. Alternatively, the support member 166 is spaced a distance from the junction of the first and second edges 154, 156. Referring to FIG. 7, the support member 166 has a first portion 166a, a second portion 166b, and a third portion 166c defining a recess adapted to receive a portion of the cross-member 28. Although the support member 166 is shown as having an angular configuration, the support member 166 can have a number of configurations, including a curvilinear configuration.

Although FIG. 5 shows four separate securing members 152 and four separate supporting members 166, the precise number of these elements varies with the design parameters of the shelf 150 and the lower assembly 14. Accordingly, the number of securing members 152 and supporting members 166 can be increased or decreased.

Figure 6:
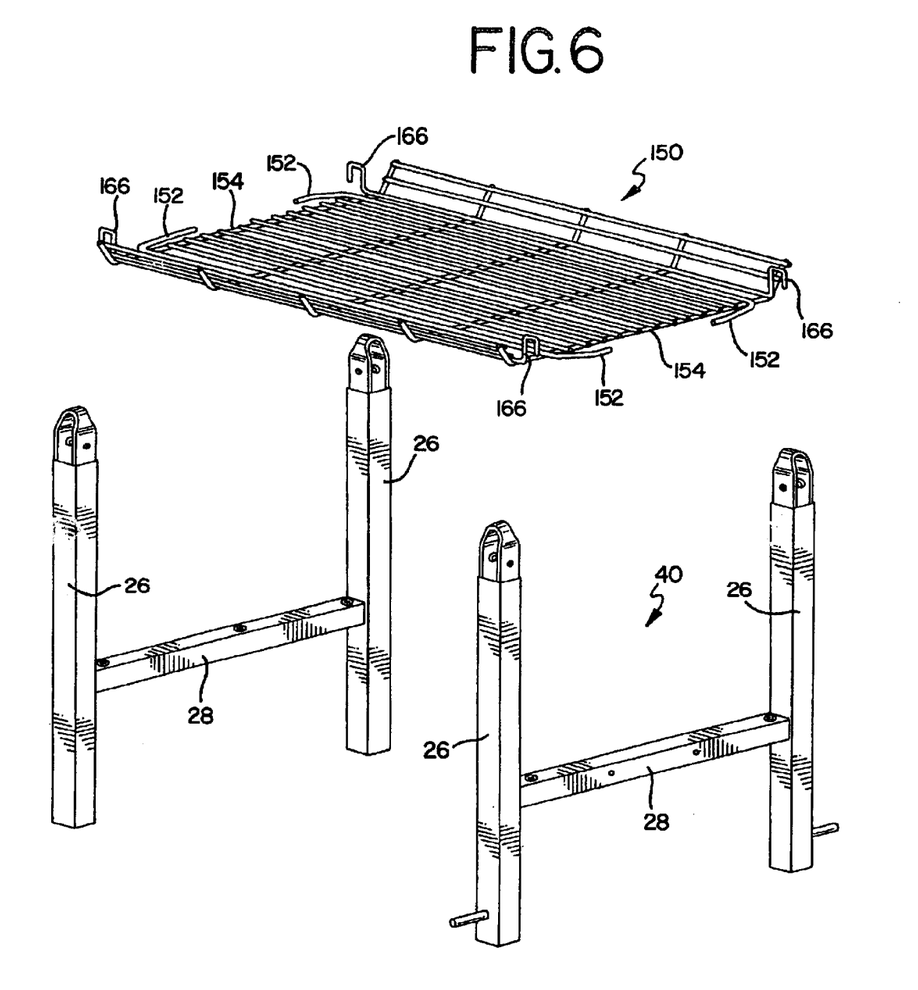
FIG. 6 is an exploded view of the shelf of FIG. 5, showing the shelf prior to engagement with a plurality of lower frame members.

Referring to FIG. 6, the H-shaped subassemblies 30 of the lower frame assembly 14 are spaced a distance defining the interior space 40. At an initial position P0 (not shown), the shelf 150 is generally positioned within the interior space 40 but does not engage any portion of the lower assembly 14. At the initial position P0, the lower assembly 14 lacks structural integrity because the H-shaped assemblies 30 are not connected. At the initial position P0, an initial clearance C0 exists between the securing member 152 and the first edge 154 of the shelf 150.

The shelf 150 is adapted to be moved between the initial position P0, a first position P1, and a second position P2. When a sufficient amount of force is applied to the shelf 150 in a downward direction, the shelf 150 moves from the initial position P0 towards the first position P1. At the first position P1, shown in FIG. 7, the shelf 150 is positioned within the interior space 40 and in partial engagement with the lower assembly 14. Specifically, the securing member 152 slidingly engages a portion of the inner wall 170 of the cross-member 28. In addition, the support member 166 engages a portion of the inner wall 170 and/or an outer wall 174.

The securing member 152 and the support member 166 continue to engage the cross-member as the downward force is applied to the shelf 150. Accordingly, the securing member 152 flexes inward an amount as the securing member 152 slidingly engages the inner wall 170 and moves from a first edge 176 of the inner wall 170 towards a second edge 178 of the inner wall 170. As the securing member 152 slidingly engages the inner wall 170, a first clearance C1 exists between the securing member 152 and the shelf 150. Because the securing member 152 flexes inward an amount, the first clearance C1 is smaller than the initial clearance C0.

Figure 8:
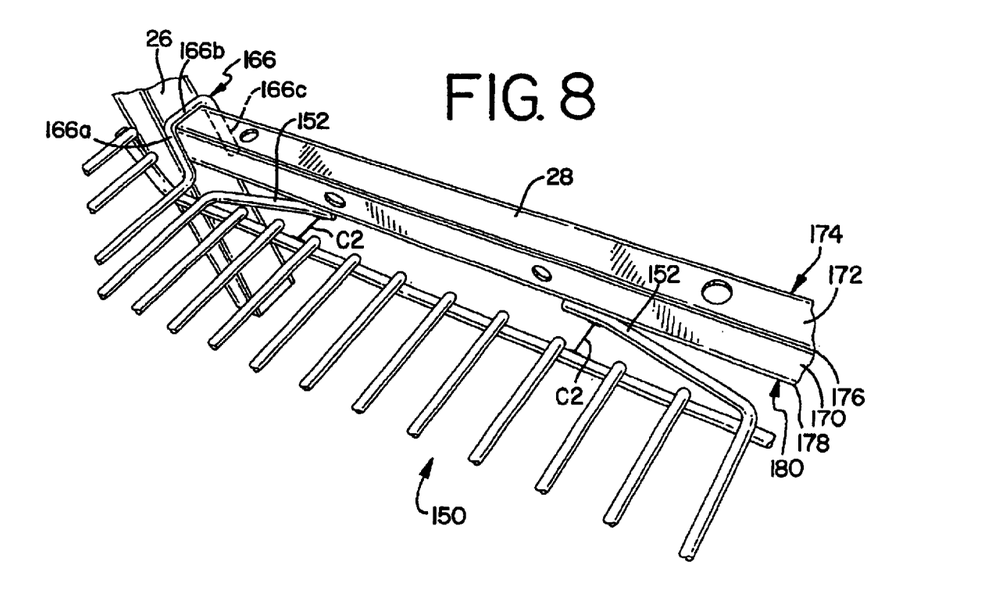
FIG. 8 is a partial perspective view of the shelf of FIG. 5, showing the shelf in a second position.
Figure 9:
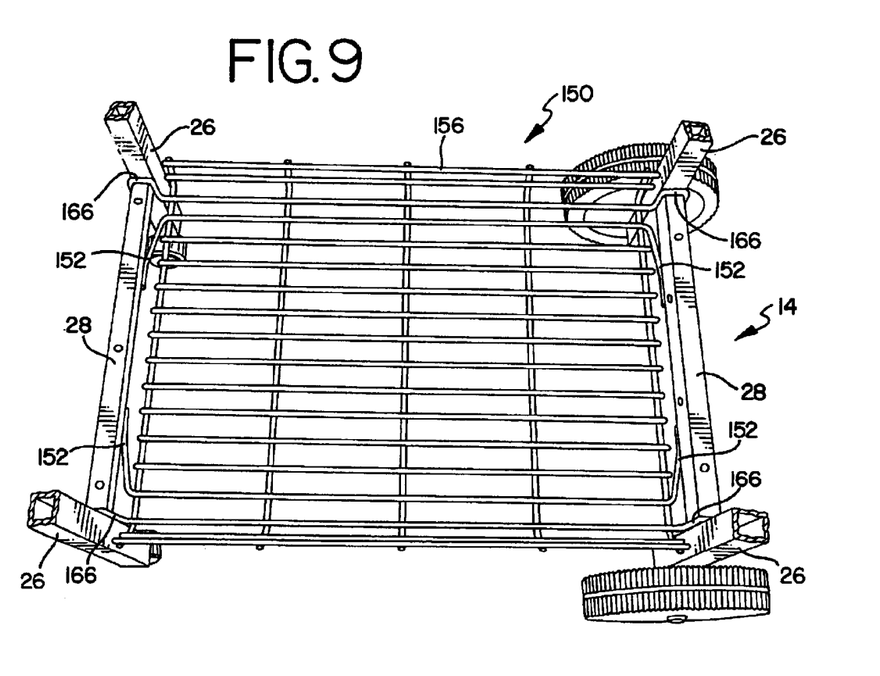
FIG. 9 is a partial perspective view of the shelf of FIG. 5, showing the shelf in the second position connected to the lower frame assembly.

The securing member 152 continues to slidingly engage the inner wall 170 as the shelf 150 and the securing member 152 move towards a second position P2. At the second position P2 and as shown in FIGS. 8 and 9, the securing member 152 lockingly engages a portion of a bottom wall 180 of the cross-member 28. In addition, the support member 166 engages a portion of the inner wall 170, a top wall 172, and/or an outer wall 174 of the cross-member 28. A second clearance C2 exists between the securing member 152 and the shelf 150 when the securing member 152 engages a portion of the bottom wall 180. Due to the flexing of the securing member 152 in the first position P1, the second clearance C2 is greater than the first clearance C1. In a preferred embodiment, the second clearance C2 is equal to the initial clearance C0.

Referring to FIG. 9, in the second position P2, the securing member 152 is in locking engagement with a portion of the bottom wall 180 of the cross-member 28 wherein the locking engagement prevents upward movement of the shelf 150. The supporting member 166 is in engagement with a portion of the inner wall 170, a top wall 172, and/or an outer wall 174 wherein the engagement prevents downward movement of the shelf 150. Described in a different manner, a portion of the cross-member 28 is received by the recess defined by the first, second, and third portions 166a, 166b, 166c of the supporting member 166. Consequently, the shelf 150 is locked in a stable position and as a result, the lower assembly 14 has increased structural rigidity. Described in another manner, the shelf 150 provides structural integrity to the lower assembly 14 when the securing member 152 and the support member 166 are located in the second position P2. As a result, the lower assembly 14 has a sufficient amount of stability to permit the alignment and engagement of the upper assembly 12 with the lower assembly 14. In a configuration with a grill assembly having a single frame with no distinct upper and lower assemblies, in the second position P2, the securing member 152 and the supporting member 166 connect and secure the single frame of the grill assembly.

Alternatively, the securing member 152 is lockingly engaged by a structure formed in a portion of the cross-member 28 in the second position P2. For example, the securing member 152 is lockingly engaged by a detent formed in a portion of the cross-member 28.

Unlike the support member 166, the securing member 152 is adapted to be deformed between the initial, first and second positions P0, P1, P2. This means that the securing member 152 deforms or flexes inward as it slidingly engages the inner wall 170 of the cross-member 28. The degree or amount of deformation varies with the dimensions and configuration of the securing member 152. Preferably, the securing member 152 is biased towards the initial position P0 or the second position P2.

The shelf 150 and its related components can be formed from plastic, steel, aluminum, or other metals, including metal alloys. The securing member 152 is preferably formed from metal because of its high strength and favorable deformation properties. Depending upon the material used to form the securing member 152, the degree and amount of elastic deformation of the securing member 152 will vary.

Figures 10, 11:
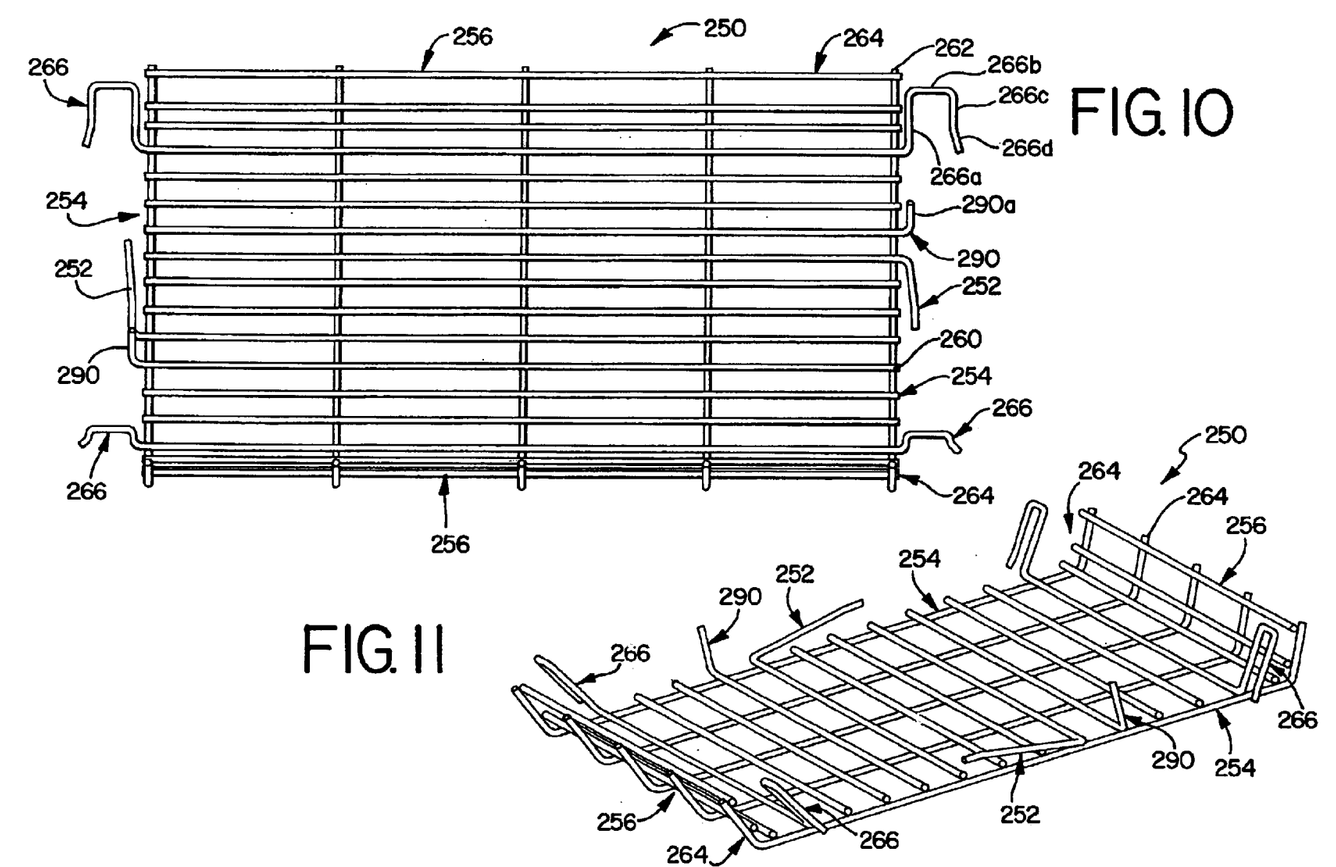
FIG. 10 is a perspective view of a third shelf embodiment.
FIG. 11 is a perspective view of the shelf of FIG. 10.

In another preferred embodiment shown in FIGS. 10 and 11, the grill assembly 10 includes a shelf 250. The shelf 250 has a pair of opposed first edges 254 and a pair of opposed second edges 256. The edges 254, 256 form a perimeter P of the shelf 250. Although shown as having a generally rectangular configuration, the shelf 250 can have a variety of configurations, including square, elliptical or other curvilinear shapes.

The shelf 250 has at least one securing member 252. The securing member 252 is a flexible structure adapted to be deformed or displaced a distance. Preferably, the securing member 252 extends from the shelf 250 such that a clearance exists between the securing member 252 and the second edge 256. Although shown as having an angular configuration, the securing member 252 can have a curvilinear configuration. Described in a different manner, the securing member 252 is an elongated tab that extends from the shelf 250.

Preferably, the shelf 250 is a wire rack formed from a plurality of welded rods. The shelf 250 comprises a plurality of longitudinal rods 260 and a plurality of transverse rods 262. Although the transverse rods 262 are shown in FIGS. 10 and 11 as being positioned below the longitudinal rods 260, the orientation of the rods 260, 262 can be varied according to the design parameters of the shelf 250. A raised or angled portion 264 is positioned proximate the second edge 256. Alternatively, the raised portion 264 is positioned proximate the first edge 254. Because the shelf 250 is formed from a plurality of welded rods, the shelf 250 is stronger and more rigid than existing shelves having a thin-wall construction. Although shown as having a plurality of apertures or openings resulting from the intersection of the rods 262, 264, the shelf 250 can have a solid construction without apertures or openings.

The shelf 250 has at least one support member 266 extending from the first edge 254. The support member 266 is adapted to engage a portion of the cross-member 28 when the shelf 250 is connected to the cross-member 28. Referring to FIGS. 10 and 11, the support member 226 has a first portion 266a, a second portion 266b, and a third portion 266c, and a fourth portion 266d defining a recess adapted to receive a portion of the cross-member 28. Preferably, the recess has dimensions slightly larger than the dimensions of the cross-member 28. The support member 226 has an angled or sloped configuration which facilitates engagement with the lower member 28 without causing abrasions on the lower member 28. Although the support member 266 is shown as having an angular configuration, the support member 266 can have a number of configurations, including a curvilinear configuration.

The shelf 250 has at least one finger 290 extending from the first edge 254. The finger 290 has a first portion 290a that is substantially vertical. The finger 290 is adapted to engage a portion of the cross-member 28 when the shelf 250 is connected to the cross-member 28. Specifically, the finger 290 engages a portion of the inner wall 170 of the cross-member 28.

Although FIGS. 10 and 11 show two separate securing members 252, two separate supporting members 266, and two separate fingers 290, the precise number of these elements varies with the design parameters of the shelf 250 and the lower assembly 14. Accordingly, the number of securing members 252, supporting members 266, and the fingers 290 can be increased or decreased.

At an initial position P0 (not shown), the shelf 250 is generally positioned within the interior space 40 but does not engage any portion of the lower assembly 14. At the initial position P0, the lower assembly 14 lacks structural integrity because the H-shaped assemblies 30 are not connected. At the initial position P0, an initial clearance C0 exists between the securing member 252 and the first edge 254 of the shelf 250.

The shelf 250 is adapted to be moved between the initial position P0, a first position P1, and a second position P2. When a sufficient amount of force is applied to the shelf 250 in a downward direction, the shelf 250 moves from the initial position P0 towards the first position P1. At the first position P1, the shelf 250 is positioned within the interior space 40 and in partial engagement with the lower assembly 14. Specifically, the securing member 252 slidingly engages a portion of the inner wall 170 of the cross-member 28. Also, the support member 266 slidingly engages a portion of the inner wall 170 and/or an outer wall 174. In addition, the finger 290 slidingly engages a portion of the inner wall 170 of the cross-member 28.

The securing member 252, the support member 266, and the finger 290 continue to engage the cross-member 28 as the downward force is applied to the shelf 150. Accordingly, the securing member 152 flexes inward an amount as the securing member 152 slidingly engages the inner wall 170 and moves from a first edge 176 of the inner wall 170 towards a second edge 178 of the inner wall 170. As the securing member 252 slidingly engages the inner wall 170, a first clearance C1 exists between the securing member 252 and the shelf 250. Because the securing member 252 flexes inward an amount, the first clearance C1 is smaller than the initial clearance C0.

The securing member 252 continues to slidingly engage the inner wall 170 as the shelf 250 and the securing member 252 move towards a second position P2. At the second position P2, the securing member 252 lockingly engages a portion of a bottom wall 180 of the cross-member 28. Also, the support member 266 engages a portion of the inner wall 170, a top wall 172, and/or an outer wall 174 of the cross-member 28. In addition, the first portion 290a of the finger 290 engages a portion of the inner wall 170. A second clearance C2 exists between the securing member 252 and the shelf 250 when the securing member 252 engages a portion of the bottom wall 180. Due to the flexing of the securing member 252 in the first position P1, the second clearance C2 is greater than the first clearance C1. In a preferred embodiment, the second clearance C2 is equal to the initial clearance C0.

In the second position P2, the securing member 252 is in locking engagement with a portion of the bottom wall 180 of the cross-member 28 wherein the locking engagement prevents upward movement of the shelf 250. The supporting member 266 is in engagement with a portion of the inner wall 170, a top wall 172, and/or an outer wall 174 wherein the engagement prevents downward movement of the shelf 250. The finger 290 is in engagement with a portion of the inner wall 170 wherein the engagement prevents lateral movement between the structures of the lower assembly 14. Consequently, the shelf 250 is locked in a stable position and as a result, the lower assembly 14 has increased structural rigidity. Described in another manner, the shelf 250 provides structural integrity to the lower assembly 14 when the securing member 252, the support member 266, and the finger 290 are located in the second position P2. As a result, the lower assembly 14 has a sufficient amount of stability to permit the alignment and engagement of the upper assembly 12 with the lower assembly 14.

The shelf 250 and its related components can be formed from plastic, steel, aluminum, or other metals, including metal alloys.

The barbecue grill assembly 10 can be assembled in a method involving a small number of steps. The shelf 50 is positioned within the lower frame assembly 14 and connected to the frame member 26, 28 in the manner disclosed above. Thus, the shelf 50 connects and secures the lower assembly 12. The upper frame assembly 12 can then be brought into engagement with the lower assembly 14. The cooking chamber 16 and the related controls can then be positioned on the upper assembly 12. Alternatively, the cooking chamber 16 is connected to the upper assembly 12 to secure the upper assembly 12. Next, the upper assembly 12 is brought into engagement with the lower assembly 14. Means for securing the upper and lower assemblies 12, 14 are then applied to secure the grill assembly 10. Securing means can include a threaded fastener and nut, or a projection and a receiver.

Alternatively, the grill assembly 10 can have single frame assembly without distinct lower and upper assemblies 12, 14. Consistent with the above disclosure, the shelf 50 is connected and secured to a lower portion of the single frame assembly. Next, the cooking chamber 16 is connected and secure to an upper portion of the single frame assembly. Means for securing the single frame assembly are then applied to secure the grill assembly 10. Securing means can include a threaded fastener and nut, or a projection and a receiver.

While specific embodiments have been illustrated and described, numerous modifications come to mind without significantly departing from the spirit of the invention and the scope of protection is only limited by the scope of the accompanying Claims.

What is claimed is:

1. A barbecue grill assembly comprising:
   an upper assembly formed from a plurality of upper frame members, the upper assembly adapted to support a cooking chamber;
   a lower assembly having a shelf and a plurality of lower frame members, the shelf having at least one securing member, the securing member adapted to move between a first position,
   wherein the securing member slidingly engages a portion of an inner wall of the lower frame member, and a second position, wherein the securing member lockingly engages a portion of a bottom wall of the lower frame member.

2. The barbecue grill assembly of claim 1 wherein the lower frame members define an interior space and the shelf is cooperatively dimensioned with the interior space such that the shelf is positioned within the interior space.

3. The barbecue grill assembly of claim 1 wherein the shelf is a wire rack.

4. The barbecue grill assembly of claim 1 wherein the securing member is biased towards the second position.

5. The barbecue grill assembly of claim 1 wherein the shelf provides structural integrity to the lower assembly when the securing member is located at the second position.

6. The barbecue grill assembly of claim 1 wherein when the securing member is located at the second position, the lower assembly has a sufficient amount of structural integrity to support the upper assembly.

7. The barbecue grill assembly of claim 1 wherein the lower frame members comprise a plurality of lower vertical members and at least one lower horizontal member.

8. The barbecue grill assembly of claim 7 wherein at the second position, the securing member engages a bottom wall of the lower horizontal member.

9. The barbecue grill assembly of claim 1 wherein the lower frame members comprise a plurality of lower vertical members and at least one lower cross-member.

10. The barbecue grill assembly of claim 9 wherein at the second position, the securing member engages a bottom wall of the lower cross-member.

11. A barbecue grill assembly comprising:
    a frame assembly formed from a plurality of frame members defining an interior space, the frame assembly adapted to support a cooking chamber, the frame assembly having at least one lower frame member; and,
    a shelf generally positioned within the interior space, the shelf having at least one securing member, the securing member adapted to move between a first position, wherein the securing member slidingly engages a portion of an inner wall of the lower frame member, and a second position, wherein the securing member lockingly engages a portion of a bottom wall of the lower frame member.

12. The barbecue grill assembly of claim 11 wherein the securing member is biased towards the second position.

13. The barbecue grill assembly of claim 11 wherein the securing member is an elongated tab.

14. A barbecue grill assembly comprising:
    a frame assembly formed from a plurality of frame members defining an interior space, the frame assembly adapted to support a cooking chamber, the frame assembly having at least one lower frame member; and,
    a shelf generally positioned within the interior space, the shelf having at least one securing member and at least one finger, the securing member adapted to move between a first position, wherein the securing member slidingly engages a portion of an inner wall of the lower frame member and the finger slidingly engages a portion of the inner wall, and a second position, wherein the securing member lockingly engages a portion of a bottom wall of the lower frame member and the finger engages a portion of the inner wall.

15. The barbecue grill assembly of claim 14 wherein the securing member is biased towards the second position.

16. The barbecue grill assembly of claim 14 wherein the securing member is an elongated tab.

* * * * *